June 17, 1941.  F. B. LLEWELLYN  2,245,599
FEEDBACK AMPLIFIER
Filed March 22, 1940  6 Sheets-Sheet 1

INVENTOR
F. B. LLEWELLYN
BY
B. C. Leger
ATTORNEY

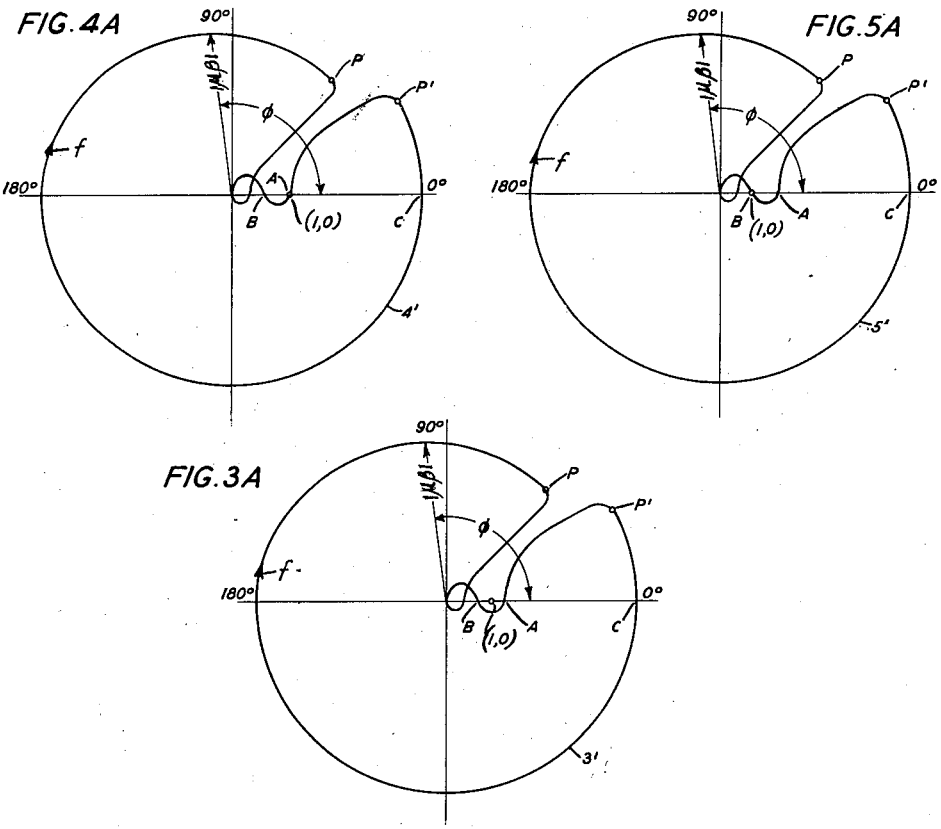
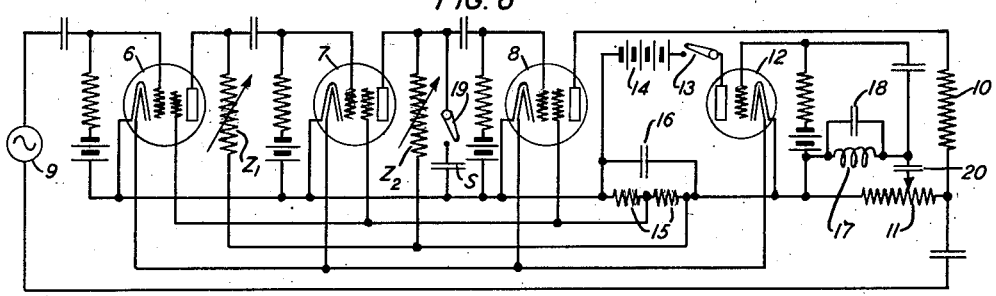

June 17, 1941.  F. B. LLEWELLYN  2,245,599
FEEDBACK AMPLIFIER
Filed March 22, 1940  6 Sheets-Sheet 3
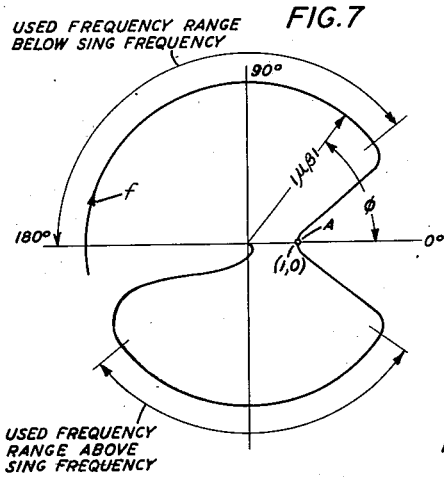
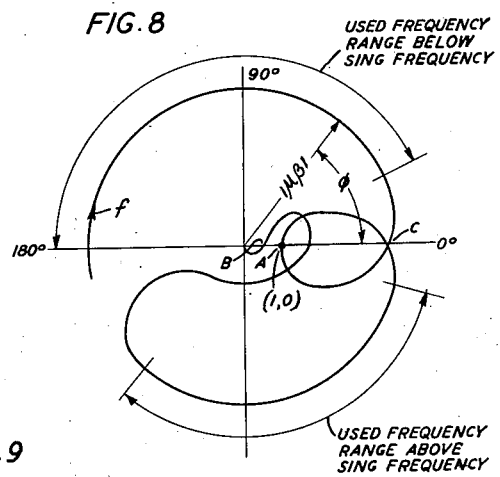
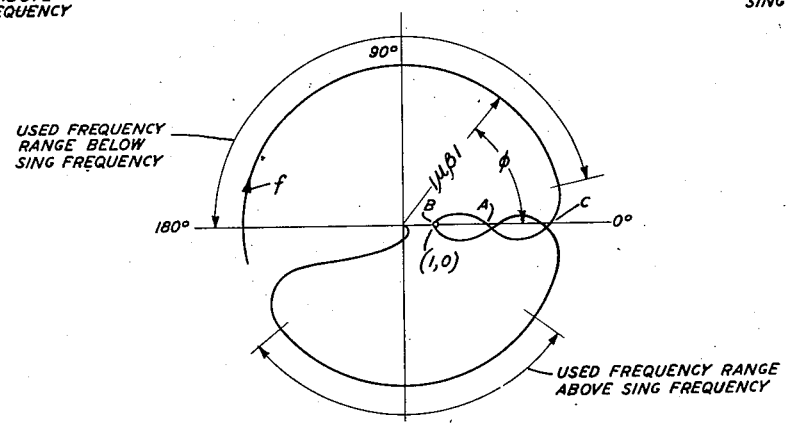
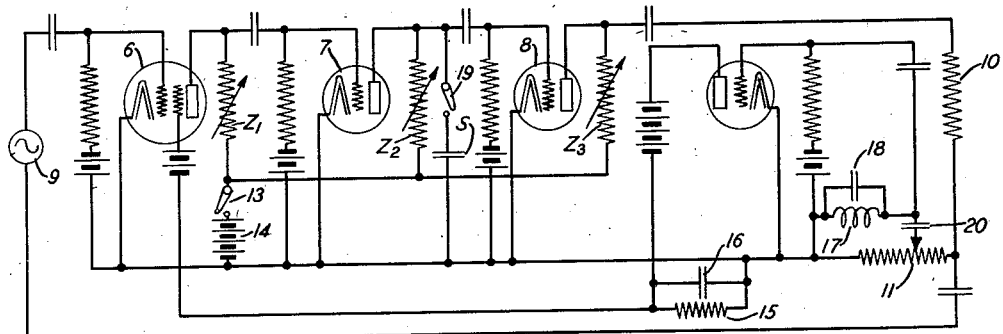
INVENTOR
F. B. LLEWELLYN
BY
ATTORNEY June 17, 1941.    F. B. LLEWELLYN    2,245,599
FEEDBACK AMPLIFIER
Filed March 22, 1940    6 Sheets-Sheet 4

INVENTOR
F. B. LLEWELLYN
BY
ATTORNEY

June 17, 1941.　　F. B. LLEWELLYN　　2,245,599
FEEDBACK AMPLIFIER
Filed March 22, 1940　　6 Sheets-Sheet 5

INVENTOR
F. B. LLEWELLYN
BY
ATTORNEY

June 17, 1941.  F. B. LLEWELLYN  2,245,599
FEEDBACK AMPLIFIER
Filed March 22, 1940   6 Sheets-Sheet 6

OSCILLATING FEEDBACK AMPLIFIERS WITH A-V-C-

INVENTOR
F. B. LLEWELLYN
BY
ATTORNEY

Patented June 17, 1941

2,245,599

UNITED STATES PATENT OFFICE 2,245,599

FEEDBACK AMPLIFIER

Frederick B. Llewellyn, Verona, N. J., assignor to Bell Telephone Laboratories, Incorporated, New York, N. Y., a corporation of New York Application March 22, 1940, Serial No. 325,297

29 Claims. (Cl. 179—171)

This invention relates to wave translation and especially to systems involving feedback amplifiers.

Objects of the invention are to control feedback, transmission gains, and frequency and amplitude of self-sustained oscillations, in such systems, and especially to increase the width of transmitted frequency band obtainable in feedback amplifiers and the loop gain obtainable over the transmitted band, facilitate starting of feedback amplifiers of singing and conditionally stable types that have loop phase equal to zero at a frequency for which steady state loop gain exceeds zero decibels, and reduce deleterious effects upon operation of amplifiers of such types caused by temporary overloads and other changes in operating conditions.

The invention may be embodied, for example, in a vacuum tube amplifier circuit which has such a large amount of feedback over a broad frequency band and such rapid decrease of loop gain with change of frequency at one edge of the band that before the decreasing loop gain reaches zero decibels the loop phase changes sign at zero degrees. In accordance with a feature of the invention, the amplifier is provided with means responsive to waves passing around the feedback loop of frequency outside of the transmission frequency band of the amplifier, for controlling the gain of the tubes as explained hereinafter to facilitate starting the amplifier, reduce deleterious effects upon its steady state operation caused by loop gain changes resulting from temporary overloading or other variations in operating conditions, or enable the amplifier to operate with a steady state oscillation which is of frequency sufficiently removed from the transmission band to make the loop gain in the transmission band large, as for example, of the order of one or more times ten decibels, and which stabilizes the loop gain without overloading the tubes.

Other objects and aspects of the invention will be apparent from the following description and claims.

In the drawings:

Figs. 1 to 5, 3A, 4A, 5A, 7 to 9, 12, and 14 show types of graphs of propagation around the feedback loop of a feedback amplifier, plotted in the complex plane, for facilitating explanation of the invention;

Fig. 6 shows a stabilized feedback amplifier circuit, embodying a form of the invention, which may have a steady state characteristic of the type shown in Fig. 3, Fig. 4, Fig. 4A, or Fig. 8, for example;

Fig. 10 shows a stabilized feedback amplifier circuit, embodying a form of the invention, which may have a steady state characteristic of the type shown in Fig. 5, Fig. 5A, Fig. 7 or Fig. 9, for example;

Figure 1:
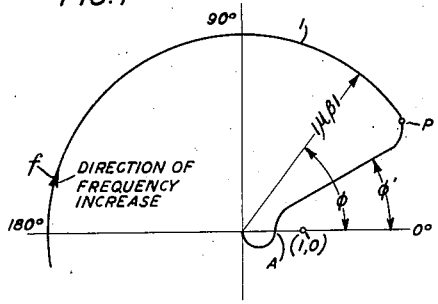

The usual negative feedback amplifier circuit (of a type disclosed for example in H. S. Black's paper on "Stabilized feedback amplifiers," Electrical Engineering, January 1934 or in his Patent 2,102,671, issued December 21, 1937, or in H. W. Bode Patent 2,123,178, July 12, 1938) is designed to constitute a system that has been referred to as a "completely stable" system, in order to provide definite and preassigned gain and phase margins against singing. A typical $\mu\beta$ diagram for such an amplifier is shown as curve 1 in Fig. 1 for frequencies from a frequency in the pass band of the amplifier to infinite frequency or very high frequencies, the arrow-head on the curve pointing in the direction of frequency increase along the curve and P indicating a point which may correspond to the top frequency of the pass band. (The $\mu\beta$ diagram is a polar plot of the magnitude $|\mu\beta|$ and phase angle $\Phi$ of the feedback ratio $\mu\beta$, the symbols $\mu$ and $\beta$ having the significance indicated in the above-mentioned paper and patents.) In a feedback loop or $\mu\beta$ loop or system, constructed in accordance with the curve of Fig. 1, the singing margins, (i. e., the margins against singing), are provided by construction of the $\mu\beta$ loop in such a way that the phase change from 180 degrees does not exceed (nor equal) 180 degrees for any frequency for which $|\mu\beta|$ exceeds (or equals) unity, or in other words, for any frequency for which the loop gain equals or exceeds zero decibels. The difference between the loop gain at the point 1,0 and the loop gain at the point A in Fig. 1, expressed in decibels, is the gain margin. The phase margin is indicated in Fig. 1 as $\Phi'$, and is the least value of $\Phi$ for any frequency for which loop gain equals or exceeds zero decibels. Practical feedback amplifiers usually have substantial gain margins and substantial phase margins. For example, certain amplifiers designed for coaxial conductor systems and transmitting wide frequency bands extending up to high frequencies have gain margins of about 15 decibels and phase margin of about 30 degrees.

A copending application of H. S. Black, Serial No. 210,333, filed May 2, 1938, brings out a way for making it practicable to eliminate necessity for gain margin, so that with $\beta$ unchanged $\mu$ can be increased to expand the $\mu\beta$ diagram until the point A coincides with the point 1,0. Such expansion of the $\mu\beta$ diagram or multiplication of $|\mu\beta|$ gives increased distortion suppression, for the same insertion gain in the pass band of the amplifier. The elimination of the necessity for gain margin involves permitting sustained oscillations, incidental to such expansion of the $\mu\beta$ diagram that the point 1,0 falls on the curve, and, in order that the singing amplifier may amplify satisfactorily, involves limiting the amplitude of the incidental sustained oscillations to a value below the overload value for the amplifying element or tubes. The increase obtainable in distortion suppression by elimination of gain and phase margin may approximate the amount of the gain margin eliminated. It is somewhat less than the gain margin eliminated because the magnitude of $\mu\beta$ in the pass band of the singing amplifier can be increased by only a portion of the eliminated gain margin by a proper circuit redesign.

Figure 2:
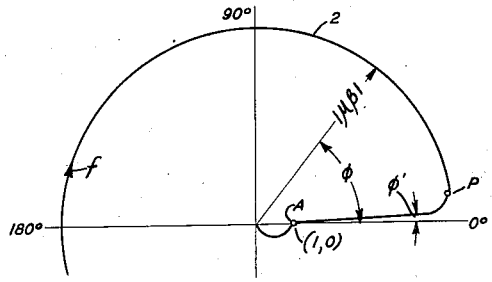

Fig. 2 shows a $\mu\beta$ diagram or characteristic 2 for the case of an amplifier in which the 30 degree phase margin of Fig. 1 has been decreased as well as the 15 decibel gain margin. It is not necessary to do this in order to obtain the advantages of the loop gain increase made available by elimination of the 15 decibel gain margin; and, for reasons made apparent hereinafter if an amplifier is to be given a $\mu\beta$ characteristic of the type of Fig. 2, then even though the gain margin is reduced to zero as shown in Fig. 2, it is ordinarily desirable to maintain a definite appreciable phase margin rather than attempt to maintain the phase margin zero or nearly zero as shown in Fig. 2.

Figure 3:
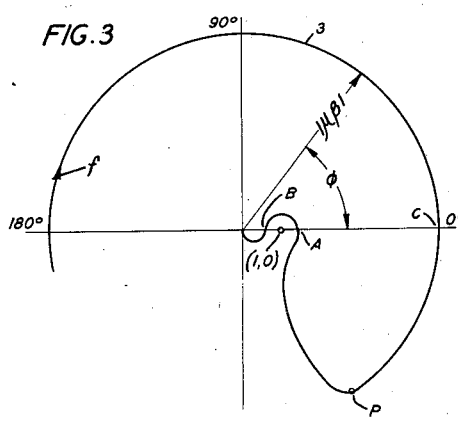

Fig. 3 shows a typical $\mu\beta$ characteristic or loop 3 of an amplifier with stability (against singing) that has been referred to as Nyquist stability. That is, as brought out in H. Nyquist Patent 1,915,440, June 27, 1933, the system is conditionally stable, for the point 1,0 lies outside of the loop. On the other hand, either an increase or a decrease in loop gain that is sufficient to cause the $\mu\beta$ curve to touch the point 1,0 will produce singing. An increase in loop gain is interpreted as an expansion of the whole $\mu\beta$ loop so that the point B approaches nearer and nearer to 1,0 whereas a decrease in loop gain is interpreted as a contraction of the loop causing the point A to move toward 1,0. The pass band may again extend from a frequency corresponding to a point at which $\Phi$ exceeds 180 degrees up to the frequency corresponding to point P, for example. The gain margins may be regarded as the difference between the loop gains at point 1,0 and point B and the difference between the loop gains at point A and point 1,0, expressed in decibels.

The $\mu\beta$ characteristic of the type of Fig. 3, allowing $\Phi$ to cross through zero at a value of $|\mu\beta|$ greater than unity, has the feature that in the frequency region directly above the pass band, i. e., in the region of the loop gain cut-off characteristic extending upward from the highest frequency of the pass band, $\Phi$ can have as small positive values as desired or even have any negative values up to substantial amounts. This feature renders it feasible to employ a sharper loop gain cut-off (i. e., a more rapid reduction of $|\mu\beta|$ with frequency increase) above the pass band, and give $|\mu\beta|$ in the pass band an increased value or give the width of the pass band an increased value. However, as pointed out in H. Nyquist Patent 1,915,441, June 27, 1933, when a feedback circuit with a $\mu\beta$ characteristic of the type shown in Fig. 3 is turned on in the normal manner, there may be a period during the heating up of the cathodes when the amplifier is unstable; and also if the amplifier becomes overloaded the tube transconductances and consequently the loop gain $|\mu\beta|$ may decrease to such a value that the unstable region is transversed. In either case the amplifier will break into a sing which is likely to remain after the amplifier is turned on or after the overload has been removed. For reasons pointed out presently, the sing frequency unfortunately is likely to be the lowest frequency at which $\Phi$ crosses through zero (as frequency increases beyond its value at which $\Phi$ crosses through 180 degrees as shown in Fig. 3); or in other words, a steady state condition is likely to be reached with the $|\mu\beta|$ values of the diagram shown in Fig. 3 shrunk to such an extent that the phase cross-over point C has moved to the left sufficiently to coincide with the point 1,0 and then the loop gain (and the insertion gain) in the frequency band which should be the pass band would be lost altogether.

In accordance with the invention, this loss of gain can be avoided as brought out hereinafter by giving the amplifier a steady state $\mu\beta$ characteristic for example of the modified type shown as curve 4 in Fig. 4 or the modified type shown as curve 5 in Fig. 5 (these modified types still allowing $\Phi$ to cross through zero at a value of $|\mu\beta|$ greater than unity, but having zero gain margin as well as zero phase margin), or by retaining the type of characteristic shown in Fig. 3 and providing means for preventing steady state oscillations from building up to harmful magnitudes when incidental to normal turning on of the amplifier or to overloading of the amplifier.

Figure 4:
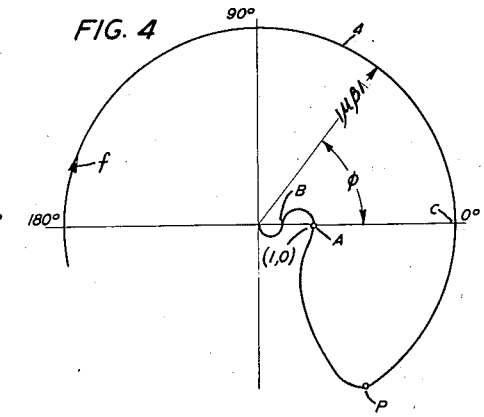
Figure 5:
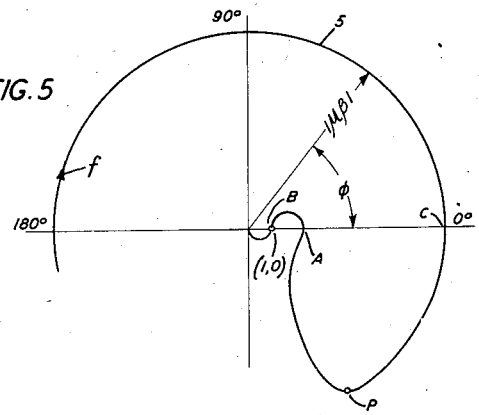

In other words, the undesirable loss of gain can be avoided by causing steady state operation of the amplifier with the $|\mu\beta|$ values of the diagram shown in Fig. 3 decreased to only such an extent that the phase cross-over point A (instead of the phase cross-over point C) falls at the point 1, 0 as shown in Fig. 4, or with the $|\mu\beta|$ values of the diagram shown in Fig. 3 increased to such an extent that the phase cross-over point B falls at the point 1, 0 as shown in Fig. 5, or with the $|\mu\beta|$ values of the diagram shown in Fig. 3 retained and means provided for preventing steady state oscillations from being caused by the transient oscillations incidental to normal turning on of the amplifier or to overloading of the amplifier.

For example, the undesirable loss of gain can be avoided by providing a control, for instance an automatic gain control or volume control responsive to incipient or transient oscillations, as described hereinafter, such that, as the amplifier is turned on and the loop gain builds up from zero, causing a point such as C to coincide with point 1, 0, or as the amplifier operating with conditional stability in accordance with the diagram of Fig. 3 suffers overload tending to make a point such as A coincide with point 1, 0, the gain control so changes $|\mu|$ as to cause steady state oscillation at point A or at point B or conditionally stable operation, i. e., to cause steady state operation of the amplifier in accordance with the $\mu\beta$ characteristic of Fig. 4 or Fig. 5 or Fig. 3. As will be made apparent hereinafter, when the steady state operation of the amplifier is to be in accordance with the $|\mu\beta|$ diagram of the type shown in Fig. 4 or the type shown in Fig. 3, the automatic gain control should be an inverse automatic gain control, or in other words, should increase $|\mu|$ in response to increase in amplitude of the transient oscillations; and when the steady state operation of the amplifier is to be in accordance with the diagram of Fig. 5 the automatic gain control should be a direct automatic gain control, or in other words, should decrease $|\mu|$ in response to increase in amplitude of the transient oscillations. When the steady state operation is in accordance with Fig. 4 or Fig. 5, the automatic gain control can enable the singing amplifier to amplify satisfactorily, by limiting the amplitude of the oscillations (whose frequency, if desired, may be far above the pass band of the amplifier) to a value sufficiently low to prevent the oscillations from overloading the amplifying elements or tubes and thereby producing loss of gain and increase of distortion. By thus allowing the amplifier to oscillate under controlled conditions necessity for maintaining gain margins against singing is eliminated and the performance of the amplifier can be improved, for example, by the oscillation stabilizing the loop gain and hence eliminating or reducing the effect which has been called the $\mu\beta$ finitude effect. (The nature of this effect and advantages of reducing it are brought out for example in a copending application of J. M. West, Serial No. 270,054, filed April 26, 1939, allowed September 29, 1939, for Wave amplifying systems, now Patent No. 2,196,-844, April 9, 1940.

The reason for provision of the automatic gain control or its equivalent where it is decided to allow the amplifier having a $\mu\beta$ characteristic of the type shown in Fig. 3 to operate with a steady state sing at a frequency corresponding to point A, or in other words, to operate in the steady state in accordance with the diagram of Fig. 4, wherein the point A coincides with the point 1,0, may be indicated as follows. Without such provision, in the physical system corresponding to this $\mu\beta$ diagram of Fig. 4 oscillations would start at a frequency corresponding to point A; but as their amplitude built up there would come a time when $|\mu|$, or the gain of the amplifier, would decrease and this decrease would cause the $\mu\beta$ diagram to shrink until finally some point such as C coincided with point 1,0, (the point C being a point that corresponds to the highest steady state value of $|\mu\beta|$ for which $\Phi=0$ degrees, or corresponds to the lowest frequency at which $\Phi$ crosses through zero, as the frequency increases beyond its value at which $\Phi$ crosses through 180 degrees as shown in Fig. 4). When this happened a steady state condition would have been obtained. On the other hand, the diagram would have shrunk to such an extent that the gain in the pass band would have been lost altogether. Therefore, it is desirable to provide a way for causing the amplifier to remain in a steady state condition with the point A coinciding with 1,0.

The answer to the question of how to provide such a way lies in the manner in which the gain changes as the oscillations build up. If the amplifier were of such a character that its gain increased when oscillations built up, then the steady state condition would be at A rather than at C. The reason for this is that if oscillations tended to build up further, (i. e., to an amplitude greater than that required to give $|\mu|$ the value necessary to make $|\mu\beta|$ equal unity for the frequency corresponding to point A), the resulting gain increase would cause the diagram to expand and thus remove 1,0 from the loop altogether. There then being no excitation for the oscillations, they would commence to die down. This, however, would cause the $\mu\beta$ diagram to shrink until A again coincided with 1,0. Conversely, if the oscillations tended to die down, then $|\mu|$ would decrease, causing the $\mu\beta$ characteristic to contract and thereby bringing 1,0 within the loop constituted by the characteristic. This would cause oscillations to build up until 1,0 and A again were brought into coincidence. Thus such an amplifier would operate with steady state oscillation of substantially fixed amplitude at the desired point A.

Fig. 6 shows an amplifier circuit, which may be for example a broad band feedback amplifier circuit, illustrating one way of obtaining such a gain-amplitude characteristic. The amplifier is shown as of the typical three-stage variety with the vacuum tubes 6, 7 and 8. The $|\mu\beta|$ characteristic of the amplifier may be of the type shown in Fig. 4, with the pass band of the amplifier extending from a frequency that corresponds to a value of $\Phi$ greater than 180 degrees up to a frequency that corresponds to point P, for example. The source 9 of waves to be amplified may be a source of voltage waves of a broad frequency band extending up to high frequencies. The output voltage is obtained across the impedance 10. The feedback is taken from an impedance 11 shown in series with the impedance 10. A fourth tube 12, operating as a rectifier or detector, has its input connected across all or a part of the impedance constituted by impedances 10 and 11. A small condenser 20 or other selective circuit means may be used to reduce or eliminate the shunting effect of the hereinafter described network 17, 18, 20 on the main feedback. This is feasible because the network 17, 18, 20 is not required nor desired to be responsive to the frequencies in the transmission band. The plate of tube 12 is connected through a switch 13 and common plate current supply battery 14 to the cathode structure of the three amplifier tubes; and a resistance 15, by-passed for the sing frequencies by condenser 16, connects this cathode structure with that of tube 12. From the resulting polarity it is seen that all three amplifier tubes 6, 7 and 8 may obtain all or a part of their plate and screen supplies from the IR drop across resistance 15. Moreover, anything which causes the direct current output of tube 12 to increase will increase the bias applied to the amplifier plates and screen grids, thus increasing the gain. The portion of the output impedance across which the grid of tube 12 is connected is responsive to the onset of oscillations. Thus the onset of oscillations produces alternating voltage across the input of tube 12 and hence an increase in the unidirectional component of its output current with consequent increase of the biasing voltages applied to the plates and screen grids of the amplifier tubes and increase of the amplifier gain. From what has been said above, it will be apparent that this action is just what is desired in order to obtain a singing amplifier whose steady state operation is in accordance with a $|\mu\beta|$ characteristic of the type shown in Fig. 4.

It may be noted that the gain control should not have too great time lag in its operation. Otherwise, if oscillations started at point A in Fig. 4, then before the gain control had time to take hold and apply such biases to the amplifier that its gain increased sufficiently to hold oscillations at A, they would have built up to such an amplitude that the gain of the amplifier would decrease through overloading and point C would have been reached before the gain control had time to assume control. Once that had occurred it would place a very severe requirement upon the gain control to reverse the action and carry the amplitude down to a such a value that steady state oscillation at A rather than at C was secured. Therefore, if a thermistor type of automatic volume control is used instead of the vacuum tube type shown for controlling transmission or gain around the amplifier loop, care should be taken to insure that its time constant is sufficiently small.

The inverse automatic gain control or inverse automatic volume control in Fig. 6 limits the amplitude of the oscillations or waves of sing frequency by holding the oscillation amplitude substantially fixed as indicated above, this fixed amplitude being adjusted to a value sufficiently below the overload value for the amplifying element or tubes to enable the singing amplifier to amplify satisfactorily the speech waves or other transmission that it is desired to amplify, without undue distortion or loss of gain. The inverse automatic volume control circuit is made sufficiently sensitive or responsive so that it will, in response to oscillations of such amplitude value below the overload value for the amplifier tubes, make $|\mu|$ sufficiently great to cause the steady state value of $|\mu\beta|$ to equal unity at the frequency corresponding to point A in Fig. 4. The contact shown movable on resistance 11 may be used to accomplish this desired adjustment of response of the automatic volume control circuit.

A selective network, for example, inductance 17 and condenser 18 shunted across the input of tube 12 and parallel resonant at the sing frequencies, may be provided in the gain control system to insure that only the sing frequencies and not frequencies of the speech or other signal channels shall affect the gain. Such provision is advantageous especially when the sing frequencies are within the transmission frequency range, for instance when the sing frequencies lie between channels of a multiplex transmission system. When the sing frequencies are within the transmission frequency range the $|\mu\beta|$ diagram may be for example of the type shown in Fig. 7, the type shown in Fig. 8, or the type shown in Fig. 9. Excepting the location of the sing frequency, Figs. 7, 8 and 9 correspond respectively to Figs. 2, 4 and 5. Thus, the gain should decrease with increase of singing amplitude for Figs. 7 and 9 but increase with singing amplitude for Fig. 8; and, in general, the gain should decrease with increase of singing amplitude for $|\mu\beta|$ diagrams in which $\Phi$ changes from plus to minus with frequency increase at 1,0, and should increase with singing amplitude for $|\mu\beta|$ diagrams in which $\Phi$ changes from minus to plus with frequency increase at 1,0.

For simplicity the filament heating circuit is omitted from Fig. 6, as it may be conventional. When the amplifier tubes are rendered operative (i. e., conditioned for amplification) by closing the filament heating circuit or the plate circuit energizing switch 13, $|\mu|$ increases (from zero) so slowly that as $|\mu\beta|$ reaches unity for a frequency at which $\Phi$ is zero, oscillations that consequently begin to build up might, if the automatic gain control or its equivalent were not provided, so alter $|\mu|$ that the amplifier might continue to sing, with a point such as C in Fig. 4 coinciding with point 1,0. The building up of the oscillations to a steady state sing with point C coinciding with point 1,0 could be prevented by placing across the $\mu\beta$ loop circuit at some point of the loop circuit a short circuit having a switch 19 therein (in series with a stopping condenser S when required), to be opened after the amplifier gain had attained its steady state value, i. e., after the amplifier tubes had become conditioned for normal operation. Ordinarily the preferred location for the short circuit would be a point of the $\mu$-circuit, the $\beta$-circuit often having a relatively low impedance. As the switch 19 opened, $|\mu\beta|$ would increase from zero through unity so rapidly that the undesired oscillations starting to build up with C coinciding with 1,0 would not have time to reach a steady state condition and the undesired steady state sing at a point such as C would be prevented. However, when sufficient inverse automatic volume control is provided, when the filament circuit or plate circuit is closed to condition the amplifier for operation, and $|\mu\beta|$ increases to unity for a frequency at which $\Phi$ is zero, the transient oscillations resulting cause the inverse automatic volume control circuit to contribute sufficiently to the rapidity of increase in $|\mu|$ and the gain to carry $|\mu\beta|$ through (i. e. above) the value unity for the frequency at which $\Phi$ is zero and cause the amplifier to operate with steady state oscillation at point A, i. e., with point A coinciding with point 1,0, as shown in Fig. 4. Thus, when the inverse automatic gain control is provided, the short-circuiting operation becomes unnecessary to start the amplifier and make it operate with a steady state characteristic of the type shown in Fig. 4.

Fig. 10 shows a broad band negative feedback amplifier circuit similar to that of Fig. 6 but with a normal or direct automatic volume control instead of the inverted automatic volume control of Fig. 6. That is, in Fig. 10 the automatic volume control reduces gain in response to increase in oscillation amplitude. This automatic volume control limits and fixes the oscillation amplitude at a value which, as in the case of Fig. 6, is sufficiently below the overload value for the amplifier tubes to enable the amplifier to amplify satisfactorily. The direct automatic volume control circuit is made sufficiently responsive so that it will, in response to oscillations of such amplitude value below the overload value for the amplifier tubes, make $|\mu|$ sufficiently small to cause the steady state value of $|\mu\beta|$ to equal unity at the frequency corresponding to point B in Figs. 5, 7, or 9. By suitable networks, as for example the coupling impedances $Z_1$, $Z_2$, and $Z_3$ indicated as generalized impedances, the $\mu\beta$ loop circuit may be made such that, with the automatic volume control the steady state operation of the amplifier is in accordance with a $\mu\beta$ characteristic for example of the type of Fig. 5, or the type of Fig. 9, or the type of Fig. 1 expanded so that point A coincides with 1,0. Then the automatic volume control causes the amplifier to oscillate in the steady state at point B in case the $\mu\beta$ diagram is of either of the two first-mentioned types of the three types just mentioned, and causes the amplifier to oscillate at the point A in case the $\mu\beta$ diagram is of the remaining one of these three types. When the diagram is as in Fig. 5, the pass band of the amplifier may extend from a frequency at which $\Phi$ exceeds 180 degrees up to a frequency corresponding to point P, for example. In operation of the circuit of Fig. 10, increase of amplitude of the output of tube 8 causes increase of the direct current plate current of rectifier 12 as in the case of Fig. 6, but the increase of direct current decreases the voltage on the screen grid of tube 6 and therefore decreases the transconductance of the tube and consequently decreases $|\mu|$ and the gain of the amplifier. As in the case of Fig. 6, the short-circuiting switch 19 may be used, in starting, in order to eliminate feedback until the vacuum tubes have had time to attain their normal values of transconductance and thus to avoid unwanted singing as at C in Fig. 4 or 5.

In the amplifiers of Figs. 6 and 10 the value of $|\mu\beta|$ may be large, for example, the loop gain being of the order of several times ten decibels, throughout the pass band or operating frequency range of the amplifier; and it should be understood that the loop gain throughout the pass bands or transmitted frequency bands above and below the sing frequency in Figs. 1 to 5 and 7 to 9, (and also in Figs. 3A, 4A and 5A described hereinafter) may similarly be made large, as for example, of the order of several times ten decibels, (the showing in the drawings, as to the values of $|\mu\beta|$ in the pass bands, having been chosen for convenience with regard to size of the $\mu\beta$ diagrams).

Figure 11:
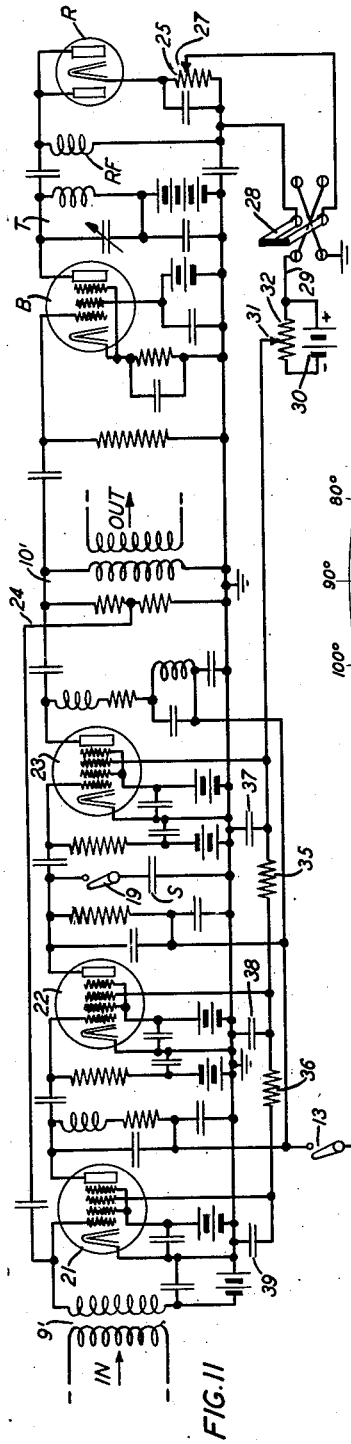
Fig. 11 shows a stabilized feedback amplifier circuit, embodying a form of the invention, whose measured characteristic is shown in Fig. 12.
Figure 12:
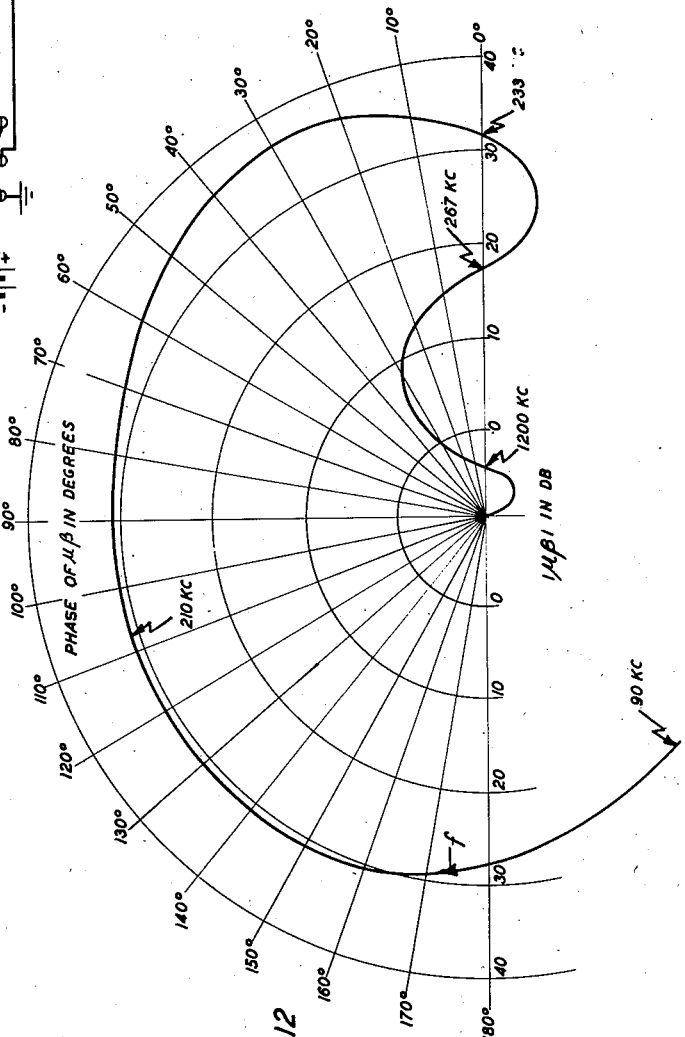

Fig. 11 shows a broad band negative feedback amplifier circuit, and Fig. 12 gives the measured phase and magnitude of $\mu\beta$ for this circuit. Fig. 12 shows that the phase of $\mu\beta$ crosses through 0 degrees at 233 kilocycles, 267 kilocycles and 1200 kilocycles. The transmission band of the amplifier may extend, for example, from a frequency somewhat below or above that at which $\Phi$ is shown as 180 degrees up to a frequency somewhat below or above 233 kilocycles. As described presently, the amplifier circuit is provided with suitable automatic gain control or automatic volume control that may be adjusted to act either directly or inversely at will, to make the amplifier oscillate in the steady state at any of these three frequencies at will, with amplitude controlled or limited by the gain control as in the case of Fig. 6 or Fig. 10 so that the singing amplifier will amplify satisfactorily. When the amplifier oscillates in the steady state at the lowest of these three phase crossing frequencies the steady state $\mu\beta$ characteristic is of the type shown in Fig. 4 modified by contraction to such an extent that point C coincides with 1.0; when the amplifier oscillates in the steady state at the second highest of these three frequencies the steady state $\mu\beta$ characteristic is of the type shown in Fig. 4; and when the amplifier oscillates at the highest phase cross-over frequency the steady state $\mu\beta$ characteristic is of the type shown in Fig. 5.

The amplifier proper is a three-stage amplifier comprising tubes 21, 22 and 23, which may be, for example, of the 6L7 type to facilitate varying $|\mu|$ and the amplifier gain over a wide range. The source 9' of waves to be amplified is indicated as an input transformer. The load circuit or impedance 10' is indicated as an output transformer with a resistance shunting its primary winding. From the resistance is derived negative feedback voltage, which is applied to the amplifier input through a feedback connection 24.

Across the primary winding of the output transformer is connected a buffer amplifier stage comprising a tube B which may be, for example, of the 6K7 type. The buffer amplifier feeds a rectifier tube R which may be, for example, of the 6N6 type through a tuned circuit T and a radio frequency choke coil RF. The network T is adjustable for resonating at any of the three frequencies at which steady state oscillation or singing is to be obtained. Network T makes the response of the automatic volume control circuit to any signal frequency as small as practicable in order to prevent the automatic volume control circuit from materially changing the magnitude of the signal which the amplifying system should amplify linearly. The coil RF provides a high frequency impedance for a wide range of high frequencies above the signal frequencies, and affords a low impedance path for rectified current of tube R. The rectified output voltage of tube R appears across resistor 25 which is by-passed by condenser 26. An adjustable contact 27 makes a portion of this unidirectional voltage available at a reversing switch 28. The buffer amplifier, the rectifier and the reversing switch constitute the main part of the automatic volume control circuit. The voltage supplied to the switch 28 is applied through that switch and connection 29 to control the bias potential on the auxiliary or gain control grid of one or more of the amplifier tubes 21, 22 and 23, and hence to control the amplifier gain in accord with the output amplitude appearing across the buffer tube B.

The sense of the gain control can be reversed by switch 28. An adjustable negative biasing voltage from a battery 30 is supplied to the control grids of tubes 21, 22 and 23 through a contact 31 movable along a resistance 32 connected across battery 30. When the switch 28 is closed to the left, the contact 27 is grounded and the lower end of resistor 25 is connected to conductor 29. Then the voltage between contact 27 and the lower end of resistor 25 serves as a negative biasing voltage for the gain control grids of the amplifier tubes which augments the negative biasing voltage from battery 30. With this condition of the switch 28, the automatic volume control is of the general type of that in Fig. 10, i. e., the automatic volume control is then a normal or direct automatic volume control. In other words, with this condition of the switch the automatic volume control decreases $|\mu|$ and the amplifier gain in response to increase of output amplitude across buffer tube B.

On the other hand, when the switch 28 is closed to the right, the lower end of resistance 25 is grounded and the contact 27 is connected to conductor 29. Then the voltage between the lower end of resistor 25 and the contact 27 serves as a positive biasing voltage opposing the negative biasing voltage from battery 30. With this condition of the switch 28, the automatic volume control is of the general type of that in Fig. 6, i. e., the automatic volume control is then an inverse automatic volume control. In other words, with this condition of switch 28 the automatic volume control increases $|\mu|$ and the amplifier gain in response to increase of output amplitude across buffer tube B.

With the operating potentials for the amplifier (for example the plate, screen grid and signal grid potentials) adjusted so that the point 1,0 lies inside the $\mu\beta$ loop characteristic, i. e., inside the loop formed by the $\mu\beta$ characteristic, the amplifier can be made to oscillate (in the steady state) at any of the three frequencies at which the phase of $\mu\beta$ crosses through zero degrees, as follows: Oscillation at either 233 kilocycles or 1200 kilocycles requires the gain of the amplifier to decrease with increase in amplitude of oscillation, whereas the 267 kilocycles oscillation requires the gain control circuit to increase the gain of the amplifier with an increase in amplitude of oscillation. As noted above, either type of gain control can be obtained with switch 28 in the appropriate condition.

With the inverse automatic volume control, that is, with the switch 28 closed to the right so that an increase in the amplitude of oscillations increases the gain, the amplifier oscillates very readily at 267 kilocycles. Without the volume control when (with the cathodes at normal energization) the plate battery switch 13 is closed to the right for the operating conditions for which the point 1,0 lies inside the $\mu\beta$ loop characteristic, the circuit normally starts oscillating at 233 kilocycles. However, with the subsequent application of sufficient inverse automatic volume control, momentarily closing switch 19 to produce a momentary short circuit across the $\mu$-circuit causes the 233 kilocycle oscillation to cease and establishes the 267 kilocycle oscillation. If the amplifier be placed in stable operation with the point 1,0 outside the $\mu\beta$ loop but between the 1200 kilocycle and the 267 kilocycle cross-over points, then again with sufficient inverse gain control the circuit starts oscillating at 267 kilocycles when the gain of the amplifier is decreased, for example by moving contact 31 to the left sufficiently to cause the $\mu\beta$ characteristic to touch or enclose the point 1,0, or in other words, sufficiently to so reduce $|\mu|$ that $|\mu\beta|$ becomes equal to or less than unity at the frequency of 267 kilocycles at which $\Phi$ is zero.

For either type of gain control the time constant of the control circuit is not critical as long as there is sufficient low frequency filtering. When the automatic volume control voltage is applied to all three tubes it may be advisable to provide additional interstage filtering in the gain control circuit, for example, as indicated by resistors 35 and 36 and condensers 37, 38 and 39, to prevent low frequency oscillation. The time constant of the gain control circuit can be increased to the order of seconds without causing difficulty.

With the inverse automatic volume control, and with steady state oscillation at 267 kilocycles, the amplitude of the 267 kilocycle oscillation increases continuously as the gain of the amplifier tends to decrease (as for example when contact 31 is moved toward the left) until the control limit is reached and the point 1,0 passes through to the outside of the $\mu\beta$ loop characteristic; (because it is increase of oscillation amplitude that is required in order to cause the automatic volume control to produce gain-increasing tendency capable of counteracting the gain-reducing tendency of the leftward movement of contact 31 and thus enabling the 267 kilocycle oscillation to persist). (This is exactly the reverse of what happens with the other type of oscillation and gain control. The amplitude of the oscillations at either 233 or 1200 kilocycles is decreased by producing a tendency to decrease gain, as for example by moving contact 31 to the left; because it is decrease of oscillation amplitude that is required to cause the automatic volume control to produce a gain-increasing tendency capable of counteracting the gain-reducing tendency of the leftward movement of contact 31 and thus enabling the 233 kilocycle or 1200 kilocycle oscillation to persist.) Furthermore, the 267 kilocycle oscillation stops altogether if the circuit gain is made to large.

This last property of the inverted automatic volume control has the practically important consequence that when the gain of the amplifier is adjusted so that the point 1,0 lies outside of the $\mu\beta$ loop characteristic, then for sufficient inverse automatic volume control the amplifier can be switched on or rendered operative (for example by closing the plate current supply switch 13 or the filament heating circuit) and the amplifier operated stably in accordance with the $\mu\beta$ diagram of the type shown in Fig. 3 without any permanent or steady state oscillation. Hence, with sufficient inverted automatic volume control it is impossible to make the amplifier that has a steady state $\mu\beta$ characteristic of the type of Fig. 3 oscillate for any operating condition for which the point 1,0 is on the outside of the loop formed by the normal $\mu\beta$ characteristic of the amplifier.

A possible explanation of the starting property of the inverse gain control, i. e., of its property of enabling the amplifier with steady state $\mu\beta$ characteristic of the type of Fig. 3, to be put in stable operation by application of its operating potentials without producing any steady state oscillation, is as follows:

When the plate voltage switch is closed, the voltage across the plates of the tubes builds up exponentially through the action of the circuit resistance and filter condensers. This building up of the voltages across the plates and cathodes causes the gain of the amplifier to increase likewise according to some exponential law. As soon as the gain has increased sufficiently to bring the point 1, 0 inside the expanding loop formed by the $\mu\beta$ characteristic, the oscillation transients start to build up exponentially. With no external gain control these transients would continue to increase until they were limited by the non-linearity of the amplifier, which is usually produced by grid currents. On the other hand, if the inverse automatic volume control, operated by the transient oscillations of increasing amplitude, (in conjunction with the exponential increase of plate potentials) can increase the gain faster than any circuit non-linearity could decrease the gain, the gain continues to increase until the point 1, 0 passes through to the outside of the loop formed by the $\mu\beta$ characteristic. As soon as this happens, the amplitude of the transient oscillations that are operating the inverse automatic volume control begins to decrease and thereby starts to decrease the gain. However, since the inverse automatic volume control circuit has a finite time constant, and since the plate voltage across the tubes is still increasing, the point 1, 0 continues to move toward its final stable position outside the loop formed by the $\mu\beta$ characteristic (i. e., the loop continues to expand to its final stable size, for which 1, 0 lies outside the loop).

Since the frequency of the transient oscillations may vary a great deal as the gain increases, the response of the inverse gain control or buffer amplifier circuits (particularly the tuned circuit T) must be sufficiently broad so that any starting transients, (i. e., any transient oscillations to be used in operating the inverse automatic volume control for starting the amplifier) can operate the inverse automatic volume control.

In the case of an amplifier which has inverse automatic volume control and which according to Fig. 4 has $\Phi$ cross through zero at three frequencies, in order to insure that the amplifier will oscillate in the steady state at the intermediate one of the three frequencies the amplifier must be such that its gain can be sufficiently increased (for instance by decrease of negative grid bias) in response to the increase of oscillation amplitude. If the gain cannot be increased more than a given amount by the inverse automatic volume control and such amount is much less than the gain decrease produced by the grid currents, then the steady state oscillation of the intermediate one of the three crossing frequencies may not be obtainable.

However, even when the action of the inverse automatic volume control is insufficient to maintain such oscillation, it may be possible to start the amplifier by application of its operating potentials without producing any permanent oscillation or sing. This is because there are two factors tending to increase the gain when the operating potentials are applied. For instance, when the plate voltage switch is closed there is, first, the inverted automatic volume control and second, the exponentially increasing plate voltage. Hence the external gain control circuit has to increase its gain only faster than the difference between the rates of change in gain produced by the increasing plate voltage and by the circuit non-linearities. The amount of inverted gain control required for this is surprisingly small. Furthermore, when the amplifier is overloaded by a signal, notwithstanding the fact that the circuit may oscillate at the lowest of the three crossing frequencies, the inverse automatic volume control can stop the oscillations as soon as the load signal is reduced below the overload value.

It is pointed out that operation of the amplifier of Fig. 11 with the steady state oscillation at the 1200 kilocycle phase cross-over point has the advantage that the insertion gain of the amplifier (for given band width and given $|\mu\beta|$, distortion reduction and gain stability) can be increased, as compared to operation with the steady state oscillation at 267 kilocycles. Similarly, operation of the amplifier of Fig. 10 with the steady state oscillation at point B in Fig. 5 is advantageous in this respect as compared to operation of the amplifier of Fig. 6 with the steady state oscillation at point A in Fig. 4.

With the $\mu\beta$ characteristic of Fig. 4 in mind, it can readily be made apparent why, if an amplifier is to be given a $\mu\beta$ characteristic of the type of Fig. 2, then even though the gain margin is reduced to zero as shown in Fig. 2, ordinarily a definite appreciable phase margin should be maintained. With the $\mu\beta$ characteristic of Fig. 2, oscillations would be stable at A for the ordinary amplifier whose gain decreased with increase of amplitude, provided that a phase margin were maintained which was sufficient to insure that a change in gain would merely multiply the whole $\mu\beta$ diagram by a certain factor and would not cause its phase to shift. However, that would be a very difficult thing to be sure of, and in Fig. 2 with its small phase margin it would be especially difficult to tell which type of gain stability or $\mu\beta$ characteristic to provide or indeed whether reliable amplification could be obtained at all; because steady state operation in accordance with the type $\mu\beta$ characteristic shown in Fig. 2 would be needed if the phase $\Phi'$ increased with amplitude increase, whereas steady state operation in accordance with the type of $\mu\beta$ characteristic shown in Fig. 4 would be required if the phase at lower frequencies than that corresponding to the point $1, 0$ in Fig. 2 decreased and passed through zero with amplitude increase. Another alternative to consider would occur when the phase $\Phi'$ increased with amplitude increase including the frequency corresponding to $1, 0$. In that event, oscillations would always build up to the overload point of the amplifier and all gain through it would be lost. Therefore, in amplifiers of the type of Fig. 2, preferably a definite phase margin should be maintained even though the gain margin is reduced to zero. When that has been done then the above-mentioned improvement approximating the amount of the gain margin eliminated can be obtained with an amplifier normal in the sense that its gain decreases with amplitude, without the use of special bias controlling circuits such as those of Fig. 6, (as is instanced in the above-mentioned copending application of H. S. Black, Serial No. 210,333).

Figure 13:
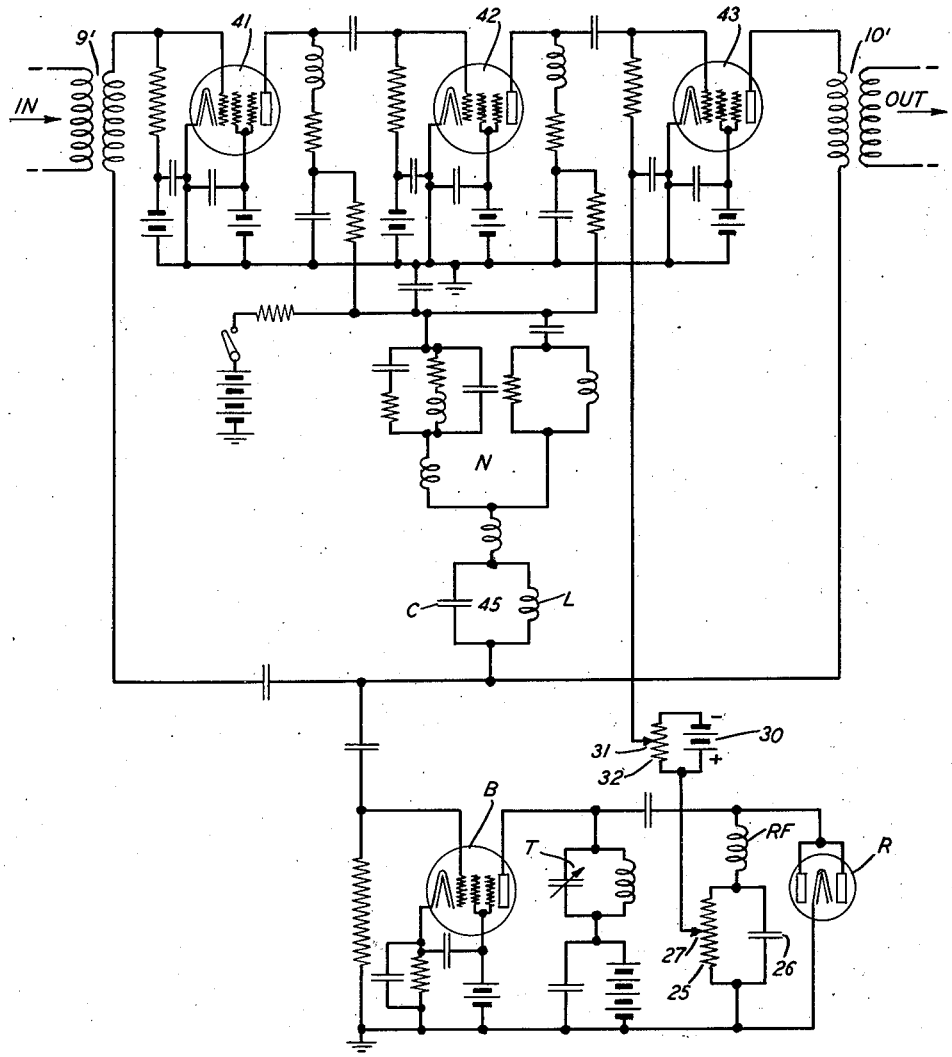
Fig. 13 shows a stabilized feedback amplifier circuit embodying a form of the invention, whose measured characteristic is shown in Fig. 14.

Fig. 13 shows a negative feedback amplifier for amplifying a band of frequencies extending from 60 kilocycles to 2000 kilocycles, in which a steady state oscillation, at about 15 megacycles, is produced in order to eliminate or reduce the $\mu\beta$ finitude effect. The $\mu\beta$ characteristic of the amplifier is given as curve 40 in Fig. 14 and is of the type shown in Fig. 2, but having, for purposes of reliability, as explained before, a greater phase margin $\Phi'$ just below the oscillation frequency of 15 megacycles than is indicated in Fig. 2.

The main amplifier comprises three cascaded vacuum tubes 41, 42 and 43. It also comprises a $\beta$-circuit network N including a parallel resonant circuit 45. The circuit 45 was added to the amplifier (which was an amplifier already at hand) to make the amplifier oscillate at about 15 megacycles. The network 45 is composed of an inductance L whose value L may be, for example, 0.156 microhenry, and a capacity C whose value C may be, for example, 500 micro-microfarads, network 45 being a low L/C ratio, tuned circuit. The amplitude of oscillations is controlled by a direct type of automatic volume control circuit, decreasing $|\mu|$ and the amplifier gain in response to increase in oscillation amplitude. The automatic volume control circuit limits the amplitude of oscillations so that the singing amplifier will amplify satisfactorily. The automatic volume control circuit comprises a tuned plate circuit buffer amplifier B and a diode rectifier R which is fed from the buffer amplifier and supplies the direct current control voltage. The input of the buffer amplifier is across the feedback path or $\beta$-circuit of the main amplifier.

To insure limitation of the amplitude of oscillations by means of the automatic volume control, it is desirable that, with no external gain control, the oscillator have the following properties: (1) the gain in each stage of the circuit of the main amplifier should decrease fairly rapidly with an increase in negative grid voltage; (2) the curve of the amplitude of oscillation versus steady biasing voltage of the grid (or each grid) to which the automatic volume control voltage is to be applied, should be a smooth curve and should not have a hysteresis loop so common with oscillators; (3) the change in the amplitude of oscillation with a change in grid bias of the tube to which the automatic volume control voltage is to be applied should be as small as practicable but different from zero.

Regarding (1), in many tubes, as for example RCA type 954 tubes, the usual operating potentials seem to be selected for the region in which the gain goes through a broad maximum as the grid voltage is varied. This maximum in gain for varying negative grid voltage may be shifted a large amount by proper adjustment of the other operating potentials. However, it is preferable to employ a type of tube, as for example the RCA 956 type, which has a particularly suitable decreasing gain characteristic.

Regarding (2) and (3), both of these properties can usually be obtained by reducing the strength of the oscillation (i. e., reducing the amplitude of the oscillation), by a decrease in the gain around the $\mu\beta$ loop at the oscillation frequency. Experimentally, it was observed that change in amplitude of oscillation with a change in circuit gain should be small for the following reasons. If the amplitude of the oscillation is large, the circuit is likely to start and stop oscillating at different values of grid voltages, and furthermore, the circuit seems suddenly to stop oscillating if the amplitude of oscillations is decreased beyond a critical value by a reduction in circuit gain. For these conditions the circuit also seems suddenly to start oscillating with a finite amplitude. When both the oscillation amplitude and the change in amplitude with a change in grid voltage are made small, these limiting values of the amplitude of oscillations with which the circuit seems suddenly to stop or start oscillating can be made very small.

Figure 14:
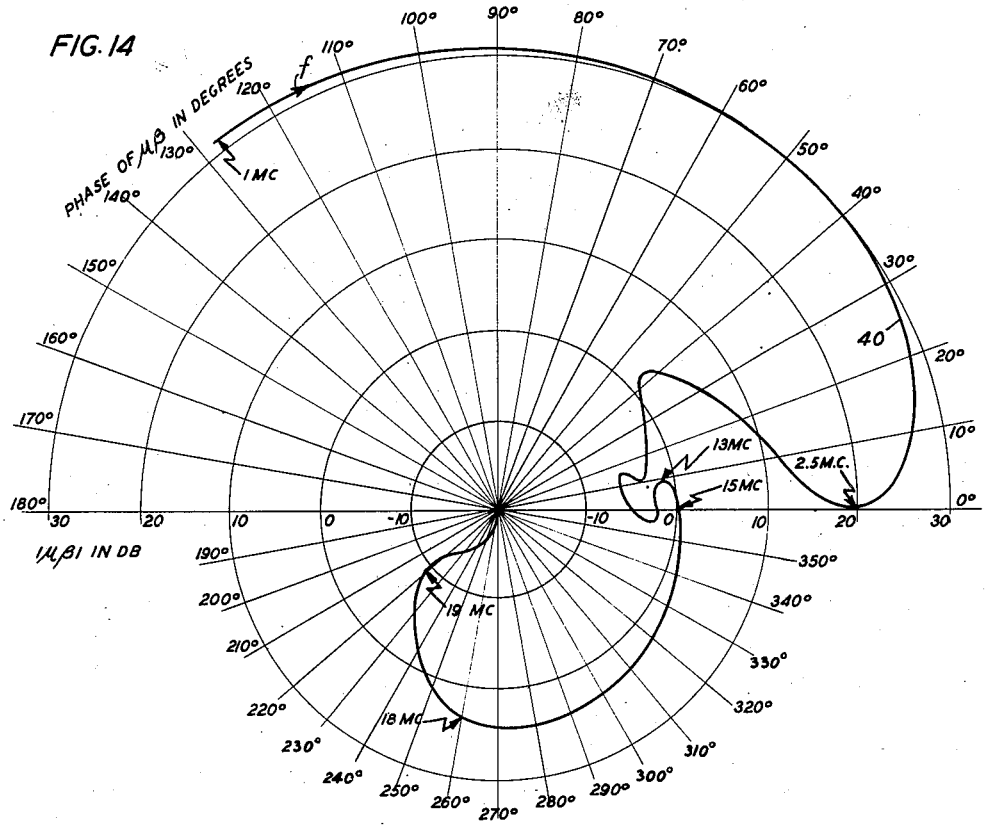

From the plot of the phase and magnitude of $\mu\beta$ given in Fig. 14 for the amplifier of Fig. 13, it is apparent that the variation of $\Phi$ with frequency introduced by the tuned circuit 45 of low L/C ratio is not as large as would be desirable in a good constant frequency oscillator, or in other words is not as large as would be desirable to give the singing amplifier (without the automatic volume control) a high degree of frequency stability. Unfortunately, in this particular broad band amplifier, the variation of $\Phi$ with frequency in the region of the oscillation frequency could not be further increased without a radical redesign of the entire feedback circuit.

With the broad band amplifier circuit shown in Fig. 13 it was found best to place the automatic volume control voltage on only one tube, which was preferably the last. When the grid control voltage was placed on more than one tube, the circuit blocked unless interstage filtering was used in the control circuit. Furthermore, it was found that the amplitude of oscillations could be limited to the smallest value by using the automatic volume control on the last tube only. The time constant of the control circuit should be large enough to produce sufficient low frequency filtering, and may be increased to be of the order of seconds without causing difficulty.

In this amplifier the amplitude of the 15 megacycle oscillation could be limited to less than a tenth of a volt (peak value) across the plate circuit of the last tube. Measurements at 500 kilocycles showed that at that frequency the value of $\mu\beta$ decreased by only a half of a decibel when the applied direct voltages were changed sufficiently to decrease the gain of a similar tube operating without gain control by 3 decibels. The fact that $\mu\beta$ changes even half a decibel with change of direct voltage was probably the result of decrease in interelectrode tube capacitance produced by the variation in operating potential. At very high frequencies, such, for example, as 15 megacycles, the gain of the interstage circuits in the broad band amplifier is determined nearly entirely by the tube capacitances. These tube interelectrode capacitances can be varied as much as 20 per cent by a variation in operating potential. At the oscillation frequency, a variation in tube potentials then produces a variation in the interstage coupling impedance as well as a variation in the transconductance of the tube. Hence, the maintenance of zero gain around the feedback loop of the amplifier (i. e., the maintenance of the value of $|\mu\beta|$ at unity) at the high frequency by the oscillation does not necessarily maintain the value of $|\mu\beta|$ at unity at lower frequencies at which the tube capacitances are of lesser importance.

The overload voltage and the insertion gain for the singing amplifier of Fig. 13 were found to be practically unchanged by the presence of the oscillation. Further, the distortion of this amplifier, as indicated by measurements of output of fundamental and second and third harmonics for 500 kilocycles fundamental inputs of various voltages, is about the same as that of a conventional negative feedback amplifier. Hence, the high frequency oscillation has materially decreased the $\mu\beta$ finitude effect without impairing the amplifier performance in any way.

Figure 15:
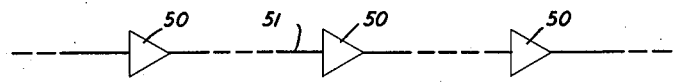
Fig. 15 shows a transmission system, in accordance with the invention, employing amplifiers which may be of the general type shown in Figs. 6, 10, 11, or 13, for example.
Figure 16:
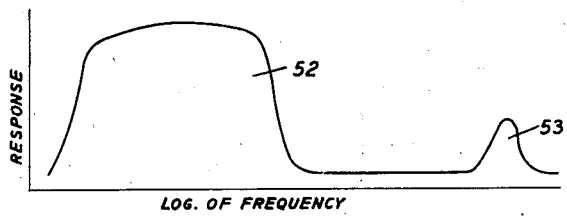
Fig. 16 shows a transmission-frequency characteristic suitable for an amplifier transformer for the amplifiers in the system of Fig. 15.

Fig. 15 shows a transmission system in which the amplifiers 50 at the various repeater stations of line 51 are feedback amplifiers operating with steady state controlled singing, such, for example, as the amplifiers of Fig. 6, 10, 11 or 13. An operating feature of the system is that the repeatered system as a whole has its transmission equivalent regulated by transmitting the sing frequency down the line and thus holding all of the amplifiers in step with one another, i. e., holding the sing frequency of all of the amplifiers the same. The transmission frequency characteristic of the transformers of the tandem connected amplifiers should be such as to pass the oscillations of sing frequency that are to be transmitted down the line, so the waves of sing frequency can flow from amplifier to amplifier through the transformers and the line. For example, the transformer structures may be such as to give the transformer the usual pass band extending over the signal freqeuncy range and, in addition, a pass band in a higher region of the frequency spectrum sufficient to pass the sing frequency. Such a transformer characteristic is shown in Fig. 16, wherein the usual pass band is indicated at 52 and the additional pass band at 53. In such a system the sing frequency may serve as a pilot channel and tends to hold the entire system at a constant gain level. This is because a change in gain anywhere in the system produces a corresponding change in sing amplitude, which in turn operates the gain controls of all of the amplifiers.

Where an amplifier, such, for example, as the amplifier of Fig. 11, for steady state operation with a $\mu\beta$ characteristic of the type shown in Fig. 3, is connected in tandem with other amplifiers of that or other type in a line, it may be placed in operation or rendered operative by closing its energizing circuits, without producing any oscillation or sing that might overload or otherwise interfere with proper operation of the other amplifiers, by virtue of the starting action of the inverse automatic volume control described above in connection with Fig. 11.

Feedback amplifiers producing steady state self-sustained low-amplitude oscillations at a frequency above the operating frequency range of the amplifier have been described above whose $\mu\beta$ characteristics are allowed to loop down across the real axis in the high frequency cut-off region as in Figs. 4 and 5, for example, thus facilitating increase of the upper cut-off frequency (and widening of the pass band), and increase of the magnitude of $\mu\beta$ in the pass band. The invention also comprehends similar feedback amplifiers producing steady state, self-sustained oscillations of limited amplitude with the oscillation frequency below (instead of above) the operating frequency range and with the $\mu\beta$ characteristic looped across the real axis in the low frequency cut-off region (instead of down across the real axis in the high frequency cut-off region) as in Figs. 4A and 5A, for example, thus facilitating decrease of the lower cut-off frequency (and widening of the pass band), and increase of the magnitude of $\mu\beta$ in the pass band.

For instance, by assigning suitable electrical values to elements of the amplifier circuit of Fig. 6 the $\mu\beta$ loop circuit may be made such that, with the automatic volume control, the steady state operation of the amplifier is in accordance with a type of $\mu\beta$ characteristic such as curve 4' of Fig. 4A. Then the automatic volume control causes the amplifier to oscillate in the steady state at the point A in Fig. 4A. When the $\mu\beta$ diagram is as in Fig. 4A, the pass band of the amplifier may extend through some such range, for example, as from a frequency corresponding to point P' up to a frequency corresponding to point P.

Similarly, by assigning appropriate electrical values to elements of the amplifier circuit of Fig. 10, the $\mu\beta$ loop circuit may be made such that, with the automatic volume control, the steady state operation of the amplifier is in accordance with a type of $\mu\beta$ characteristic such as curve 5' of Fig. 5A. Then the automatic volume control causes the amplifier to oscillate in the steady state at the point B in Fig. 5A. With a $\mu\beta$ diagram such as that of Fig. 5A, the pass band of the amplifier may extend through a range, for example, from a frequency corresponding to point P' up to a frequency corresponding to point P.

Fig. 3A bears to Fig. 3 a relation similar to that which Figs. 4A and 5A bear to Figs. 4 and 5, respectively. By assigning appropriate electrical values to elements of the amplifier circuit of Fig. 6, the $\mu\beta$ loop circuit may be made such that, with the automatic volume control, the steady state operation of the amplifier is conditionally stable, operation in accordance with a type of $\mu\beta$ characteristic such as curve 3' of Fig. 3A, and the amplifier can be started and brought into such conditionally stable operation (without recourse to the short circuit through switch 19) by energizing the amplifier tubes to render the amplifier active, as for example by closing switch 13 with the amplifier circuit otherwise conditioned for steady state operation in accordance with a $\mu\beta$ characteristic of the type shown in Fig. 3A. Also if the amplitude of the input from source 9 becomes so great as to cause the amplifier to sing, the automatic volume control can restore the conditionally stable steady state operation of the amplifier upon cessation of the overload. When the $\mu\beta$ diagram is one such as that of Fig. 3A, the pass band of the amplifier may extend through a range, for example, from a frequency corresponding to point P' up to a frequency corresponding to point P.

What is claimed is:

1. The method of operating an amplifier which comprises supplying to the amplifier waves to be amplified thereby, feeding back a portion of the output to the input, maintaining the steady state value of $|\mu\beta|$ equal to unity for a frequency at which $\Phi$ equals zero and simultaneously maintaining the steady state value of $|\mu\beta|$ greater than unity for a lower frequency at which $\Phi$ equals zero.

2. The method of operating an amplifier which comprises supplying to the amplifier waves to be amplified thereby, feeding back a portion of the output to the input, maintaining the steady state value of $|\mu\beta|$ equal to unity for a frequency at which $\Phi$ equals zero and simultaneously maintaining the steady state value of $|\mu\beta|$ greater than unity for a lower frequency which lies above the lower edge of the pass band of the amplifier and at which $\Phi$ changes from positive to negative with frequency increase at zero degrees.

3. The method of operating an amplifier which comprises supplying to the amplifier waves to be amplified thereby, feeding back a portion of the output to the input, maintaining the steady state value of $|\mu\beta|$ equal to unity for a frequency at which $\Phi$ equals zero and simultaneously maintaining the steady state value of $|\mu\beta|$ greater than unity for a higher frequency which lies below the upper edge of the lowest pass band of the amplifier and at which $\Phi$ equals zero.

4. The method of operating an amplifier which comprises supplying to the amplifier waves to be amplified thereby, feeding back a portion of the output to the input, maintaining the steady state value of $|\mu\beta|$ equal to unity for a frequency at which $\Phi$ equals zero, and simultaneously therewith maintaining the steady state value of $|\mu\beta|$ greater than unity for two lower frequencies at which $\Phi$ changes sign at zero degrees.

5. In combination, an amplifier, means forming with said amplifier a feedback loop having loop gain decrease so rapidly with change of frequency at one side of the operating frequency range of the amplifier that before the decreasing loop gain reaches zero decibels, the loop phase changes sign at zero degrees, and means responsive to change of amplitude of oscillations passing around the loop for controlling the gain of the amplifier.

6. In combination, an amplifier, means forming with said amplifier a feedback loop having such rapid decrease of gain with change of frequency near one edge of the transmission frequency band of the amplifier that before the decreasing loop gain reaches zero decibels the loop phase changes sign at zero degrees, and means selective to frequencies outside of said band responsive to changes in amplitude of waves of the selected frequencies passing around the loop for maintaining the gain of the amplifier at a value producing stead state self-sustained oscillations around the loop of frequency outside of said band beyond said band edge and of amplitude limited to a value below the overload value for the amplifier.

7. An amplifier, means for supplying thereto waves to be amplified thereby, and a circuit forming therewith a feedback loop, said circuit having its phase shift equal and opposite to that of said amplifier at two frequencies and having its loss equal to the steady state gain of the amplifier at the higher of said frequencies and less than the steady state gain of the amplifier at the lower of said frequencies.

8. An amplifier, means for supplying thereto waves to be amplified thereby, and a circuit forming therewith a feedback loop, said circuit having its phase shift equal and opposite to that of said amplifier at two frequencies above the lower limiting frequency of a pass band of the amplifier and having its loss equal to the steady state gain of the amplifier at the higher of said two frequencies and less than the steady state gain of the amplifier at the lower of said two frequencies.

9. The method of operating an amplifier which comprises supplying to the amplifier waves to be amplified thereby, feeding back a portion of the output to the input, maintaining the steady state value of $|\mu\beta|$ equal to unity for a frequency at which $\Phi$ equals zero and simultaneously therewith maintaining the steady state value of $|\mu\beta|$ greater than unity for two higher frequencies at which $\Phi$ equals zero.

10. An amplifier, means for supplying thereto waves to be amplified thereby, and a circuit forming therewith a feedback loop, said circuit having its phase shift equal and opposite to that of said amplifier at three frequencies and having its loss equal to the steady state gain of the amplifier at the highest of said frequencies and less than the steady state gain of the amplifier at each of the other two of said three frequencies.

11. The method of operating an amplifier which comprises supplying to the amplifier waves to be amplified thereby, feeding back a portion of the output to the input, maintaining the steady state value of $|\mu\beta|$ equal to unity for a frequency at which $\Phi$ equals zero and simultaneously therewith maintaining the steady state value of $|\mu\beta|$ greater than units for two frequencies at which $\Phi$ equals zero, one of said two frequencies being lower and the other higher than the first-mentioned frequency.

12. The method of operating an amplifier which comprises supplying to the amplifier waves to be amplified thereby, feeding back a portion of the output to the input with $|\mu\beta|$ of larger order of magnitude than unity for frequencies in the pass band of the amplifier, maintaining the steady state value of $|\mu\beta|$ equal to unity for a frequency at which $\Phi$ changes from plus to minus with increasing frequency and simultaneously therewith maintaining the steady state value of $|\mu\beta|$ greater than unity for two lower frequencies which lie above the lower edge of the pass band of the amplifier and at the lower of which the sign of $\Phi$ changes from positive to negative with increasing frequency and at the upper of which the sign of $\Phi$ changes from negative to positive with increasing frequency.

13. The method of operating an amplifier which comprises supplying thereto waves of two frequency bands to be amplified thereby, feeding back a portion of the output to the input, maintaining the steady state value of $|\mu\beta|$ equal to unity for a frequency at which $\Phi$ equals zero and simultaneously maintaining the steady state value of $|\mu\beta|$ greater than unity for a lower frequency at which $\Phi$ equals zero, and which lies between said bands.

14. The method of operating an amplifier which comprises supplying thereto waves of a plurality of working frequency ranges, feeding back a portion of the output to the input, maintaining the steady state value of $|\mu\beta|$ equal to unity for a frequency at which $\Phi$ equals zero and simultaneously therewith maintaining the steady state value of $|\mu\beta|$ greater than unity for two lower frequencies at which $\Phi$ equals zero and which lie between said working frequency ranges of the amplifier.

15. A wave translating system comprising an amplifier, means forming with said amplifier a self-oscillating feedback loop, and means for increasing the gain for transmission once around the loop in response to increase of the oscillation amplitude.

16. A negative feedback amplifier having means for producing steady state self-sustained oscillations therein, and means for increasing the steady state oscillation frequency comprising a circuit for increasing the single trip gain around the feedback loop in response to increase of amplitude of oscillations passing around the loop.

17. A self-oscillating negative feedback amplifier and means for limiting the amplitude of self-sustaining oscillations passing around the feedback loop of the amplifier comprising an inverse automatic volume control circuit responsive to increase of amplitude of oscillations passing around the feedback loop of the amplifier for increasing the loop gain.

18. A wave translating system comprising an amplifier, means forming with said amplifier a feedback loop having the loop gain so great over a frequency band extending so far upwardly from a frequency at which the loop phase shift is 180 degrees that self-sustained oscillations around the loop result at a frequency above said band, a rectifier responsive to the oscillations, and means responsive to the rectifier output for controlling the gain of the amplifier.

19. A wave translating system comprising an amplifier, means forming with said amplifier a feedback loop having the loop phase shift equal to zero at three frequencies, and means for causing the loop gain to be zero at the highest of said three frequencies and greater than zero at each of the other two of said three frequencies, said last-mentioned means comprising a rectifier circuit responsive to increase of amplitude of self-sustained oscillations passing around said loop for decreasing the gain of said amplifier.

20. In combination, an amplifier, a feedback circuit forming therewith a feedback loop adapted to produce self-sustaining oscillations of a given frequency around the loop when the gain of the amplifier is limited by non-linearity in the input-output characteristic of the amplifier, with the sign of $\Phi$ for a higher frequency then changing from negative to positive with increasing frequency at a value of $|\mu\beta|$ between zero and unity, and an inverse automatic volume control circuit for preventing the amplifier gain from being limited by the non-linearity in the amplifier characteristic, said inverse automatic volume control circuit being responsive to increase an amplitude of oscillations building up around the loop for increasing the gain of the amplifier at a greater rate with amplitude increase than the rate at which the non-linearity decreases the gain with amplitude increase, until $|\mu\beta|$ becomes unity at a frequency at which $\Phi$ is zero and which is higher than said given frequency.

21. In combination, an amplifier, a feedback circuit forming therewith a feedback loop adapted to produce self-sustaining oscillations of a given frequency around the loop when the gain of the amplifier is limited by non-linearity in the input-output characteristic of the amplifier, with the sign of Φ for a higher frequency then changing from negative to positive with increasing frequency at a value of $|\mu\beta|$ between zero and unity and with the sign of Φ for a still higher frequency then changing back from positive to negative with increasing frequency at a lower value of $|\mu\beta|$ between zero and unity, and a direct automatic volume control circuit for preventing the amplifier gain from being limited by the non-linearity in the amplifier characteristic, said volume control circuit being responsive to increase of amplitude of oscillations building up around the loop for decreasing the gain of the amplifier until $|\mu\beta|$ becomes unity at a frequency at which the sign of Φ changes from plus to minus with increasing frequency and which is higher than said given frequency.

22. A wave translating system comprising an amplifier having an input circuit and an output circuit, a source of waves connected to said input circuit for supplying to said amplifier waves to be amplified thereby, a load circuit connected to said amplifying circuit for received amplified waves from said amplifier, a feedback path connecting said output circuit to said input circuit and forming with said amplifier and circuits a feedback loop having zero loop phase shift at a frequency in the pass band of the amplifier at which the real part of the loop transfer constant is of larger order of magnitude than unity, and means responsive to increase in amplitude of waves transmitted around the loop for increasing the gain of the amplifier.

23. An amplifier and a circuit forming therewith a feedback loop, said circuit having its phase shift equal and opposite to that of said amplifier at two frequencies at each of which its loss is less than the steady state gain of the amplifier, and means responsive to increase in amplitude of waves transmitted around the loop for increasing the gain of the amplifier.

24. An amplifier and a circuit forming therewith a feedback loop, said loop having its phase shift different from zero for every frequency for which the steady state loop gain is zero decibels and said circuit having its phase shift equal and opposite to that of said amplifier at two frequencies at each of which its loss is less than the steady state gain of the amplifier, and means responsive to increase in amplitude of waves transmitted around the loop for increasing the gain of the amplifier for a given transmission efficiency of said circuit.

25. A wave translating system comprising an amplifier, means forming with said amplifier a self-oscillating feedback loop, and a circuit having a time constant of the order of seconds for increasing the loop gain in response to increase of the oscillation amplitude.

26. The method of operating a feedback loop including an amplifier, a feedback circuit for feeding back waves from the output to the input of the amplifier, and means responsive to increase of amplitude of waves passing around the feedback loop for increasing the gain of the amplifier, which comprises maintaining the amplifier inactive with the feedback loop otherwise conditioned for steady state operation in which the sign of the loop phase shift changes from positive to negative with frequency increase at a frequency for which the loop gain exceeds zero decibels and changes back from negative to positive with frequency increase at a higher frequency for which the loop gain is zero decibels, and rendering the amplifier active when the loop is so conditioned.

27. The method of operating a feedback loop including an amplifier, a feedback current for feeding waves from the output back to the input circuit of the amplifier, and means responsive to increase of amplitude of waves passing around the feedback loop for increasing the gain of the amplifier, which comprises maintaining the amplifier inactive with the transmission characteristics of the feedback loop otherwise adjusted for conditionally stable steady state operation in which the loop phase shift is zero at two frequencies for which the loop gain exceeds zero decibels, and rendering the amplifier active when the loop characteristics are so adjusted.

28. A wave transmission system comprising a plurality of amplifiers, each of said amplifiers having a forwardly transmitting portion and a feedback circuit therefor for production of steady state self-sustained oscillations of given frequency in the amplifier, and each of said amplifiers having means responsive to the oscillations for limiting their amplitude to a value below the overload value for the amplifier and controlling the gain of the forwardly transmitting portion of the amplifier, a transmission line, and means connecting said amplifiers in tandem in said line and transmitting said oscillations from amplifier to amplifier through said line for causing the oscillations of said amplifier to have the same frequency for all of the amplifiers and maintain the system at a substantially constant gain level.

29. A wave translating system comprising an amplifier, means forming with said amplifier a feedback loop having the loop gain so great over a frequency band extending so far upwardly from a frequently at which the loop phase shift is 180 degrees that self-sustained oscillations around the loop result at a frequency above said band, means responsive to said oscillations for limiting their amplitude to a value below the overload value for the amplifier, and means for utilizing said oscillations of limited amplitude.

FREDERICK B. LLEWELLYN.